US005952064A

United States Patent [19]

van der Bleek et al.

[11] Patent Number: 5,952,064

[45] Date of Patent: Sep. 14, 1999

[54] STRETCHED TUBULAR FILM FOR HOLDING FOODSTUFF

[75] Inventors: Mark van der Bleek, Rossville; David Pohl, Danville, both of Ill.

[73] Assignee: Teepak Investments, Inc., Wilmington, Del.

[21] Appl. No.: 08/797,766

[22] Filed: Feb. 7, 1997

Related U.S. Application Data

[63] Continuation-in-part of application No. 08/568,076, Dec. 6, 1995.

[51] Int. Cl.[6] .......................... A22C 13/00; B29D 22/00; A23G 1/00; D01F 11/02

[52] U.S. Cl. ...................... 428/34.8; 428/35.2; 428/35.7; 428/36.9; 426/105; 426/118.1; 426/135; 426/129; 426/413; 264/188; 264/197; 264/198

[58] Field of Search ................................ 428/34.8, 35.2, 428/35.7, 536, 34.9, 36.9; 264/188, 197, 198; 426/105, 413, 135, 129; 138/118; 206/802

[56] References Cited

U.S. PATENT DOCUMENTS

| | | | |
|---|---|---|---|
| 2,901,358 | 8/1959 | Underwood et al. | 99/176 |
| 2,999,756 | 9/1961 | Shiner et al. | 99/176 |
| 2,999,757 | 9/1961 | Shiner et al. | 99/176 |
| 3,835,113 | 9/1974 | Burke et al. | 260/216 |
| 4,356,200 | 10/1982 | Hammer et al. | 426/105 |
| 4,563,231 | 1/1986 | Porrmann et al. | 156/90 |
| 4,590,107 | 5/1986 | Bridgeford | 428/36 |
| 4,784,186 | 11/1988 | Stenger et al. | 138/118.1 |
| 5,658,524 | 8/1997 | Portnoy et al. | 264/559 |

FOREIGN PATENT DOCUMENTS

| | | |
|---|---|---|
| 0662283 | 7/1995 | European Pat. Off. . |
| 793789 | 12/1955 | United Kingdom . |
| WO 82/02649 | 8/1982 | WIPO . |

*Primary Examiner*—Ellis Robinson
*Assistant Examiner*—Jennifer M. Hayes
*Attorney, Agent, or Firm*—Michael L. Dunn

[57] ABSTRACT

A tubular film for encasing food. The tubular film comprises a material which has been regenerated from a viscose solution. The tubular material is longitudinally stretched by from +8 to +40 percent and transversely stretched by from −20 to +40 percent while wet and the stretch is maintained during drying, said transverse stretch and longitudinal stretch being sufficient to obtain a surface area increase of at least 10 percent from the point of regeneration. In general, the tubular material has a wall thickness of from about 60 to about 90 percent of the same tubular material except without the combined stretch. The invention also includes the method for making the tubular material by stretching the regenerated tubular material while wet and maintaining the stretch during drying.

12 Claims, 1 Drawing Sheet

12

10

11

STRETCHED TUBULAR FILM FOR HOLDING FOODSTUFF

This is a continuation-in-part of co-pending patent application Ser. No. 08/568,076 filed Dec. 6, 1995.

BACKGROUND OF THE INVENTION

This invention relates to tubular film for encasing food products such as sausage and cheese. The invention more particularly relates to such casing material made from regenerated cellulose.

Food casings made from regenerated cellulose have been known for an extended period of time and can be made using methods well known to those skilled in the art. In particular, xanthate viscose is made by treating cellulose from cotton, wood, or other plant fiber with alkali followed by dissolving in carbon disulfide. The resulting viscose is then extruded through a die to form a tube. The resulting tube is then regenerated, usually by passing it through a coagulating bath containing coagulating materials such as sodium sulfate, and sulfuric acid. The casing is then dried.

U.S. Pat. Nos. 2,999,756 and 3,835,113 describe such processes in detail.

It is also known that cellulose containing casings can be made by extruding viscose onto a cellulose fiber web, usually a non-woven paper, shaped in the form of a tube, followed by regeneration. Such casings are known as "fibrous" casings.

The term "regenerated cellulose food casings" as used herein is intended to include both types of casings to the extent that reinforcing does not impede the process of the invention.

Regenerated cellulose food casings have been successful for a number of reasons including relatively low cost, permeability to smoke, strength and dimensional stability.

Despite the advantages of regenerated cellulose food casings, there are a number of areas where properties could be improved. In particular, longitudinal dimensional stability is not as good as desired, especially when the casing is wet, i.e. a stuffed food casing will have unacceptable longitudinal stretch when hung vertically, e.g. in a smoke house or for purposes of curing. Such stretch can be as much as ten percent or more.

While regenerated cellulose food casings have fair permeability, it is still not as good as desired. And in order to obtain sufficient strength, the wall of the casing has been thicker than desired. Thicker walls use more viscose material than desired, decrease permeability, and reduce the quantity (unshirred length) of casing that can be shirred (longitudinally folded and compressed) into a standard unit of shirred length.

Attempts have been made to make such casings with thinner walls by variation of processing conditions, e.g. chemical changes in the regenerating bath as described in U.S. Pat. No. 4,590,107. Unfortunately such thin wall casings have had insufficient burst strength and tensile strength for commercial application.

BRIEF DESCRIPTION OF THE INVENTION

Figure 1:
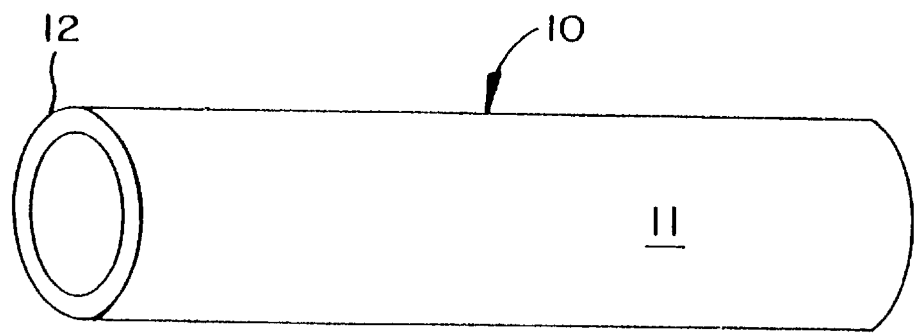
FIG. 1 shows a perspective view of a tubular film of the invention.

The invention comprises a tubular film which may be used for encasing food. The tubular film comprises a material which has been regenerated from a solution of cellulose in a solvent which usually, but not always, comprises carbon disulfide.

More particularly, the invention comprises a tubular film comprising a material which has been regenerated from a solution of cellulose and dried. The tubular film, after regeneration, is longitudinally stretched by from 8 to 40 percent and simultaneously transversely stretched by from −20 to +40 percent while wet. The combined longitudinal and transverse stretch is sufficient to increase the surface area of the film by at least ten percent from the surface area immediately after regeneration. The stretch is maintained during drying. The resulting tubular film has a wall thickness of from about 60 to about 90 percent of a tubular film which is identical except without the combined stretch.

In other words, the tubular film of the invention has a wall thickness of from about 60 to about 90 percent of a prior art tubular film which would be identical, except for being unstretched as described herein. Such a prior art film is not stretched after regeneration to obtain at least a 10 percent increase in surface area and such a prior art film is not longitudinally stretched after regeneration by more than 8 percent. Further such a stretch is not maintained in any prior art film while the film is dried. As a result, such a prior art film does not have the unique properties of the film of the invention, i.e. reduced film thickness, high burst strength, better permeability, superior tensile strength, good dimensional stability and a rewet longitudinal shrinkage of at least 2 and as much as 7 percent.

The invention also includes the method or process for making the above film.

In particular the method comprises:

extruding a tube from viscose;

coagulating the tube in a bath comprising acid and salt to form a regenerated cellulose tubular film;

longitudinally stretching the film by from about 8 to about 40 percent and simultaneously transversely stretching the film by from −20 to +40 and often percent while wet, the combined longitudinal and transverse stretch being sufficient to increase the surface area of the film by at least ten percent from the surface area immediately after regeneration; and maintaining said combined stretch during drying, to form a dry tubular film having a wall thickness of from 60 to 90 percent of the same tubular film without the combined stretch.

DETAILED DESCRIPTION OF THE INVENTION

In accordance with the invention, the tubular material 10 comprises regenerated cellulose 11. The tubular film has many uses as a packaging and wrapping material. The tube may, for example, be split to form a film having essentially the same uses as cellophane film. The tubular material is especially suitable for use as a food casing for foodstuffs such as sausage and cheese.

The casing is made by extruding viscose which may be any modified or unmodified cellulose solution, e.g. a solution of cellulose in an amine oxide or in a mixture of copper hydroxide and ammonium hydroxide (cuprammonium process) or a solution of cellulose aminomethanate. However, the viscose is usually alkali cellulose reacted with carbon disulfide (xanthate viscose). The viscose is extruded either into the form of a tube or to impregnate a fiber web formed in the shape of a tube. The tube is preferably unreinforced so that the reinforcement does not restrict the stretching operation.

The viscose is then regenerated. Such regeneration primarily occurs in one or more acid and salt baths in the case of xanthate viscose. Regeneration as used herein means the essentially complete regeneration obtained in a final regeneration bath before drying. It is believed that such regeneration results in the removal of at least 90 percent of solubilizing groups added to the cellulose during the process (e.g., $CS_2$ in xanthate viscose, and aminomethanate groups in aminomethanate viscose). The regenerated film before drying is self supporting and stretchable. In solvent processes which dissolve unmodified cellulose, e.g., solutions in an amine oxide, regeneration means the final solvent removal step to form a self supporting stretchable film, before drying.

While it is still wet, after regeneration, the tubular material is longitudinally stretched by from 8 to 40 percent, and usually from 10 to 20 percent, and transversely stretched by from −20 to +40 percent, and usually 0 to 10 percent. The combined stretch is sufficient to provide a net increase in surface area of at least +10 percent and preferably at least +15 percent after the point of regeneration. The stretch is maintained during drying. In general, the tubular material has a wall thickness 12 of from about 60 to about 90 percent of a tubular material which is identical except without the combined stretch after regeneration maintained during drying.

In general, for a food casing of a diameter usual for a hot dog, the casing has a wall thickness of between 14 and 25 microns (micrometers) and usually between 21 and 23 microns.

In addition the food casing of the invention has a permeability to smoke and other vapors which is from about 20 to about 50 percent or more greater than the same casing except not being stretched in accordance with the invention.

The other physical properties of the casing of the invention, despite having a significantly thinner wall, are surprisingly close to unstretched casing and often even better. For example the burst pressure is at least 88 percent, and usually at least 95 percent of the burst pressure of a casing unstretched in accordance with the invention. The longitudinal tensile strength is at least 85 percent, usually at least 90 percent and commonly over 100 percent of the longitudinal tensile strength of the same casing except for being unstretched as described herein.

A unique aspect of the casing of the invention is that it has a rewet shrinkage along the longitudinal axis of at least 2 and usually at least 3 percent. The rewet length is usually −2 to −7, and more often −3 to −6 percent from the dry casing.

The following examples serve to illustrate and not limit the present invention.

EXAMPLE 1

Figure 2:
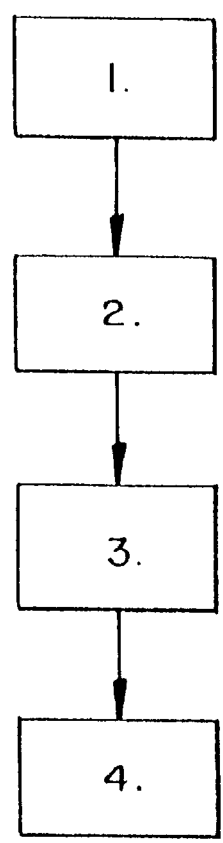
FIG. 2 shows a block diagram of the method of the invention.

In general the tubular film of the invention was made by the following steps shown in the process blocks of FIG. 2:

1. extruding a tube from viscose;
2. coagulating the tube in a bath comprising acid and salt to form a regenerated cellulose tubular film;
3. longitudinally stretching the film by from +8 to +40 percent and transversely stretching the film by from −20 to +20 percent while wet, said transverse stretch being less than 75 percent of the longitudinal stretch, the combined longitudinal and transverse stretch being sufficient to increase the surface area of the film by at least 10 percent from the point of regeneration; and
4. maintaining said stretch during drying, to form a dry tubular film having a wall thickness of from about 60 to about 90 percent of a tubular film which is identical except for having a combined longitudinal and transverse stretch insufficient to increase surface area by at least 10 percent and except for being longitudinally stretched by less than 8 percent.

Viscose was made essentially as described in U.S. Pat. No. 3,835,113 and, except as otherwise indicated, was extruded and regenerated substantially as described in U.S. Pat. No. 2,999,756. The die was for a code 24 casing (about 25.4 mm wet flat stock width). The take up speed after drying was varied by from −2.5 to +30 percent from the speed through the coagulation (regeneration) bath. The coagulation (regeneration) bath contained a sulfuric acid concentration of 132 grams per liter and a sodium sulfate salt concentration of 253 grams per liter. For purposes of plasticization, the casing was passed twice through tanks containing glycerine to obtain a glycerine content of about 15.4 percent. The flow of viscose at the point of extrusion is sufficient to yield a finished film thickness of about one mil if unstretched. After extrusion, the casing is inflated with air to expand the diameter to about 20 mm.

The results are shown in Table 1. Table 1 clearly shows the effects of maintaining longitudinal stretch in the dryer. Strength properties are not significantly altered but the thickness of the casing is substantially less and longitudinal stretch after drying is greatly reduced. Permeability studies show better permeability at the reduced thickness.

In Table 1, the following abbreviations are used:

BDG=bone dry gauge, the thickness of the dry film in grams of cellulose per ten meters of length.

DFW=dry flat width., 0.24 means code 24 as used in the industry which is a width of about 32.7 mm.

gpm=gallons per minute.

EXAMPLES 2–6

The procedure of Example 1 was followed except that various longitudinal and transverse stretches were imparted to the regenerated tubular film by varying take up speeds at the end of the film forming line to vary longitudinal stretch and by varying air inflation to vary transverse stretch. The results are shown in Table 2. These results clearly show that comparable burst pressures can be obtained with more than 40 percent less film thickness (60% combined stretch which increases surface area by 68%).

TABLE 1

| Longitudinal Stretch After Regeneration | −2.5%/STD | −2.5%/STD | 10% | 10% | 15% | 15% | 20% | 20% | 30% | 30% |
|---|---|---|---|---|---|---|---|---|---|---|
| Code | 24 | 24 | 24 | 24 | 24 | 24 | 24 | 24 | 24 | 24 |
| Stretch After Coag and Maintained in Dryer | −2.5% | −2.5% | +10.0% | +10.0% | +15% | +15% | +20.0% | +20.0% | +30.0% | +30.0% |
| Coag | | | | | | | | | | |
| Temperature | 42.5 | 42.5 | 42.5 | 42.5 | 42.5 | 42.5 | 42.5 | 42.5 | 42.5 | 42.5 |
| Acid Conc. | 132 | 132 | 132 | 132 | 132 | 132 | 132 | 132 | 132 | 132 |
| Salt Conc. | 253 | 253 | 253 | 253 | 253 | 253 | 253 | 253 | 253 | 253 |

TABLE 1-continued

| Longitudinal Stretch After Regeneration | −2.5%/STD | −2.5%/STD | 10% | 10% | 15% | 15% | 20% | 20% | 30% | 30% |
|---|---|---|---|---|---|---|---|---|---|---|
| BDG | 19 | 19 | 16.9 | 16.9 | 16.1 | 16.1 | 15.4 | 15.4 | 14.3 | 14.3 |
| DFW | 24 guage | 24 guage | 24 guage | 24 guage | 24 guage | 24 guage | 24 guage | 24 guage | 24 guage | 24 guage |
| Glyc Tank Passes | 2 | 2 | 2 | 2 | 2 | 2 | 2 | 2 | 2 | 2 |
| Profile | | | | | | | | | | |
| Time | | | | | | | | | | |
| PIV rpm | 73.5 | 73.3 | | | | | | | | |
| Casing Analyses | | | | | | | | | | |
| BDG | 19.2 | 19.1 | 17 | 17.1 | 16.2 | 16.3 | 15.8 | 15.6 | 14.5 | 14.7 |
| % BDG Change from STD 19.0 | 1.1 | 0.5 | −10.5 | −10.0 | −14.7 | −14.2 | −16.8 | −17.9 | −23.7 | −22.6 |
| pH | 9.2 | 9.3 | 9.3 | 9.3 | 9.2 | 9 | 9.1 | 9.1 | 9.3 | 9.2 |
| % Glycerine | 15.7 | 15.6 | 15.7 | 15.7 | 15.3 | 15.1 | 15.7 | 15.7 | 15.9 | 15.6 |
| Rewet Burst Press | 33.84 | 34.01 | 33.04 | 33.92 | 33.84 | 33.69 | 32.84 | 31.93 | 30.32 | 31.20 |
| Burst Dia. | 38.24 | 35.72 | 38.33 | 37.96 | 37.02 | 37.79 | 38.37 | 35.05 | 35.51 | 35.67 |
| Rewet Long. Instrons | | | | | | | | | | |
| Film Thickness (inches) | 0.0017 | 0.0016 | 0.0016 | 0.0015 | 0.0015 | 0.0014 | 0.0014 | 0.0014 | | |
| Force to Break 1" (lbs) | 6.040 | 6.290 | 5.74 | 5.7 | 5.94 | 6.13 | 6.59 | 6.12 | | |
| Max. Mod. (psi) | 14519 | 15733 | 23811 | 25394 | 30164 | 33830 | 39478 | 38551 | | |
| Max. Tensile (psi) | 7102 | 7861 | 7172 | 7617 | 7925 | 8758 | 9416 | 8743 | | |
| Rewet Trans. Instrons | | | | | | | | | | |
| Film Thickness (inches) | 0.0017 | 0.0016 | 0.0016 | 0.0015 | 0.0015 | 0.0014 | 0.0014 | 0.0014 | | |
| Force to Break 1" (lbs) | 10.170 | 10.660 | 9.73 | 9.73 | 9.29 | 8.5 | 7.72 | 8.7 | | |
| Max. Mod. (psi) | 8831 | 9531 | 8982 | 9642 | 9276 | 9791 | 9370 | 9493 | | |
| Max. Tensile (psi) | 6007 | 6661 | 6086 | 6503 | 6195 | 6092 | 5516 | 6212 | | |

TABLE 2

| TEST PART | EXTRUDED CODE | DRY END CODE | STRETCH (%) AFTER REGEN-ERATION | EX-TRUDED FW (mm) | DRY END FW (mm) | TRANS-VERSE STRETCH (%) | BASIS WT (G/M2) | THICK-NESS (MM) | REWET LENGTH CHANGE (%) | BURST PRESSURE (CM HG) | BURST DIAMETER (mm) |
|---|---|---|---|---|---|---|---|---|---|---|---|
| A | 24 | 19 | +40% | 33.7 | 27 | −20 | 25.4 | 0.023 | −4.8 | 29.5 | 39 |
| B | 24 | 25 | +40% | 33.7 | 33.7 | 0 | 20.3 | 0.017 | −6.2 | 28.4 | 38.6 |
| C | 24 | 30 | +40% | 33.7 | 40.5 | +20 | 16.9 | 0.014 | −6.4 | 28.9 | 41.8 |
| STD | 24 | 24 | STD(−2.5) | 33.7 | 32.3 | −4.2 | 29.4 | 0.025 | −0.2 | 30.34 | 43.4 |
| STD | 30 | 30 | STD(−2.5) | 44 | 41 | −7 | 31.0 | 0.025 | −0.5 | 25.7 | 40.4 |

What is claimed is:

1. A tubular film having a surface area comprising a material which has been regenerated from a solution of cellulose and dried, said tubular film, after regeneration, being longitudinally stretched by a lower limit of 10 percent and an upper limit of 40 percent and simultaneously transversely stretched by from −20 to +40 percent while wet, said stretch being maintained during drying, combined longitudinal and transverse stretch being sufficient to increase the surface area of the film by at least ten percent from the surface area immediately after regeneration and said combined longitudinal and transverse stretch providing a rewet longitudinal shrinkage of at least two percent, said tubular film having a wall thickness of from about 60 to about 90 percent of an identical tubular film without said combined stretch.

2. The tubular film of claim 1 wherein said film is longitudinally stretched by from 10 to 20 percent.

3. The tubular film of claim 1 having a wall thickness of from 18 to 25 microns.

4. The tubular film of claim 3 having a wall thickness of from 21 to 23 microns.

5. The tubular film of claim 1 having a permeability to smoke which is 20 to 50 percent greater than an identical film without said combined stretch.

6. The tubular film of claim 1 wherein the film has a burst pressure of at least 88 percent of the burst pressure of an identical film without said combined stretch.

7. The tubular film of claim 1 wherein the tube has a longitudinal shrinkage when rewet of at least 3 percent.

8. The tubular film of claim 1 wherein the solution of cellulose is xanthate viscose.

9. The tubular film of claim 1 wherein the transverse stretch is less than 30%.

10. A process for making the tubular film of claim 1 which comprises:

extruding a tube from viscose;

coagulating the tube in a bath comprising acid and salt to form a regenerated cellulose tubular film;

longitudinally stretching the film by a lower limit of 10 to an upper limit of 40 percent and simultaneously transversely stretching the film by −20 to +40 percent while wet, the combined longitudinal and transverse stretch being sufficient to increase the surface area of the film by at least ten percent from the surface area immediately after regeneration; said longitudinal and transverse stretching being selected to provide a rewet longitudinal shrinkage of at least two percent;

maintaining said stretch during drying, to form a dry tubular film having a wall thickness of from about 60 to about 90 percent of the same tubular film without said combined stretch.

11. The process of claim 10 wherein the longitudinal shrinkage is at least three percent.

12. The process of claim 10 wherein the transverse stretch is less than 30%.

* * * * *